United States Patent [19]
Hübers et al.

[11] Patent Number: 5,602,867
[45] Date of Patent: Feb. 11, 1997

[54] METHOD OF AND DEVICE FOR OPERATING AN ARC FURNACE WITH TWO VESSELS

[75] Inventors: Andreas Hübers, Hattingen; Karl-Josef Schneider, Schermbeck, both of Germany

[73] Assignee: Man Gutehoffnungshütte Aktiengesellschaft, Oberhausen, Germany

[21] Appl. No.: 567,917

[22] Filed: Dec. 7, 1995

[30] Foreign Application Priority Data

Dec. 17, 1994 [DE] Germany .................. 44 45 209.8

[51] Int. Cl.⁶ .................................................. F27D 23/00
[52] U.S. Cl. ........................... 373/78; 373/43; 373/79; 266/144; 266/44; 75/10.41
[58] Field of Search ..................... 373/78, 79, 85, 373/43, 45, 66; 266/144, 163; 75/13; 210/711

[56] References Cited

U.S. PATENT DOCUMENTS

| | | | |
|---|---|---|---|
| 3,623,975 | 11/1971 | Cardinal, Jr. .................. | 210/711 |
| 4,032,121 | 6/1977 | Stift et al. ..................... | 266/163 |
| 4,490,827 | 12/1984 | Dikta ............................ | 373/103 |
| 4,531,971 | 7/1985 | Sugiura et al. ................ | 75/13 |
| 5,393,037 | 2/1995 | Ehle et al. .................... | 266/144 |

Primary Examiner—Tu B. Hoang
Attorney, Agent, or Firm—Max Fogiel

[57] ABSTRACT

An arrangement for operating an arc furnace with two vessels for making steel. Enough liquid raw iron is added to account for 70% of the total starting metallurgicals. The supply of electricity to one of the vessels is discontinued but not to the other vessel. The injection of oxygen through a lance accompanied by the addition of sponge or coolant and lime, is carried out in one vessel while an electric-arc furnace phase is carried out in the other vessel, whereby additional sponge or coolant is melted with less oxygen and additional lime or coal is added. Electrodes are mounted on an arm and can be pivoted over either vessel as desired.

10 Claims, 5 Drawing Sheets

METHOD OF AND DEVICE FOR OPERATING AN ARC FURNACE WITH TWO VESSELS

BACKGROUND OF THE INVENTION

The present invention concerns a method of and device for operating an arc furnace with two vessels, I and II, especially for making steel. Both vessels have lids. There are electrodes on one lid, which pivots. The furnace has lances for injecting oxygen, lime, coal, and gaseous or liquid fuels. To carry out the method, the supply of electricity to one of the vessels, which is charged with starting metallurgicals and covered with a lid, is discontinued but not the supply to the other vessel, which proceeds to carry out metallurgical processing, melting or superheating, for example, until it is time to tap the melt.

Several methods of producing raw steel are known. They proceed by the classic route of blast furnace and converter and mainly use a hot liquid mixed with scrap, oar, sponge, and other starting metallurgicals. The vessels, electric-arc furnaces, mainly use cold or heated starting materials.

Electric-arc furnaces are mainly employed and operated individually.

Systems have been developed recently, however, that, due to the increasing scarcity of natural resources, are intended to ensure steel production that is cost-effective and environmentally friendly.

Among these known approaches is one that employs hot flue gases pumped out of the furnace itself to preliminarily heat the charge, usually scrap, in an electric-arc furnace.

A melting system comprising two adjacent vessels is known from European Patent 0 483 322. It is equipped with a heater to supply energy for heating the melt. Each vessel has a lid, two ports, and gas lines. The gas lines can be blocked. Each port in one vessel communicates with a port in the other vessel through one of the lines. The gas generated when material is melted in one vessel can accordingly be conveyed to the other to preliminarily heat the starting material therein. One outer section of the lid in one furnace can be replaced by a shaft secured in a framework. The shaft has a gated opening at the lid for loading starting material and contains the port associated with that furnace.

A method of and device for operating a two-furnace plant is known from German 4 302 285. The device is in two parts and intended for melting steel. The method is in several steps.

Electricity is supplied to one of the furnaces to melt the scrap accommodated therein. The other is disconnected from the network. The disconnected furnace is tapped and charged with new material, mainly scrap. The lid is replaced. Any gas inside the vessel is pumped out from above the bed of scrap. Flue gas is then pumped out of the electrically connected furnace and into the disconnected furnace. The flow of flue gas from the other furnace is discontinued to allow the gas to be cleaned while the flue gas is being pumped out of the disconnected furnace.

How much raw iron can be used in arc furnaces is limited because pig takes so long to melt. Furthermore, it has until now been impossible to satisfactorily process (decarbonize) liquid raw iron in electric-arc furnaces.

The two known two-furnace plants are in no way appropriate for or even intended for processing liquid raw iron, especially in large batches that can account for more than half of the metallurgical material employed.

SUMMARY OF THE INVENTION

The object of the present invention is a device and method for producing steel in a two-furnace plant that will save energy, protect the environment, and be cost-effective and that will allow the use of 50% or more liquid raw iron in terms of the solid starting material, which can be sponge, ore, scrap, or other metallurgical material.

The two-vessel arc furnace in accordance with the present invention can be closed off by a pivoting lid. The furnace is equipped with a transformer that supplies a powerful current to the electrodes, which are mounted on a swinging arm.

Each lid has a round opening at the center for the electrodes to extend into the vessel through. These openings can be closed when necessary by a hatch secured to a traveling gallows. The hatch also has an opening at the center to allow a lance to be inserted into the vessel.

The oxygen-injection lances, top lances in the present case, extend through the center of the the vessel's lid and are secured at one side to a support by way of a pivoting arm.

Oxygen, lime, coal, and gas or liquid fuels can also be added to the vessel in the known way through lances that extend through the side.

The vessel or vessels are lined below the water-cooled wall section with extra refractory material. The capacity of the hearth is simultaneously expanded by means of a depression at the bottom and beneath the oxygen-injection lance.

The extra lining at the bottom of the vessel and the depression in the hearth increase the depth of the melt and allows oxygen to be injected as deep as in the Lenz-Donau system while protecting the lining of the hearth while the melt is being decarbonized with oxygen.

The vessels can be mounted on a cradle. The cradle can travel on racks and pinions or as specified in German 4 244 228 on at least two rollers. Such a cradle will allow the furnace to tilt down 10 to pour off the slag. The electrodes, mounted on their arm, and the lances do not participate in the tilting and will not be damaged. The lid lifting and swingout mechanism is mounted on the platform in known arc furnaces with a rack-and-pinion cradle and tilt along with them.

The lid can be mounted in a lift that travels back and forth on a carriage along with the oxygen lance (the top lance) instead of pivoting on an arm, and removes to one side of the vessel. Such an approach, however, will necessitate another completely equipped electrode lid secured to the pivoting arm such that it can be lowered over either vessel I or vessel II. The sideways traveling lids only have the opening at the center for the top lance to extend through. The hatch with its traveling or pivoting support is unnecessary in this embodiment.

Finally, the two-vessel plant can also be operated as a direct-current arc furnace, whereby the vessels will have only one lid electrode (the cathode) and one bottom electrode (the anode) in the hearth.

The method of producing steel in an arc furnace from liquid raw iron in conjunction with sponge and/or scrap while adding oxygen and lime in accordance with the present invention is carried out in two phases, a Bessemer decarbonization phase and an electric-arc furnace phase.

The Bessemer decarbonization phase is carried out first, in vessel I, and comprises decarbonizing the liquid raw iron with oxygen, coolants, and lime. The electric-arc furnace phase, which comprises melting the sponge or scrap, the lime, and any coal that has been added while decreasing the supply of oxygen, is carried out in vessel II.

Once either one of these phases has been completed in its associated vessel, whatever phase of steel production comes next is carried out in each vessels.

These simultaneous and parallel phases will now be specified.

The Bessemer decarbonization phase carried out in vessel I constitutes a) deoxidation of the residual slag and the sump, charging with liquid raw iron to 70% of all the starting metallurgicals over the residual sump, b) decarbonization with oxygen through an oxygen-injection lance (top lance) extending through the lid while simultaneously adding sponge, ore, or scrap in accordance with the heat equilibrium for vessel I and continuous addition of lime for the metallurgical aspects: removing the silicon, phosphorus, and sulfur for example.

c) continuous removal of some of the slag or removal of some of the slag during interruptions in injection, or blowing off the liquid slag through a slagging door with the vessel slightly tilted followed by sampling and testing the melt temperature, d) pivoting the oxygen (top) lance out of the way and replacing the hatch in the lid.

The electric-arc furnace phase, carried out in vessel II, comprises a) pivoting the electrodes on their arm into place with the high-power lines connected to the transformer, b) supplying electricity to the electrodes while adding sponge, ore, scrap, or other starting metallurgicals until there is enough weight to justify tapping along with more injection of oxygen and lime during melting and superheating, c) continuous removal of some slag and/or removal of some slag through the slagging door with the vessel slightly tilted while the slags are melting or after they have melted and accompanied by sampling and temperature measurement, d) superheating the melt followed by temperature measurement, e) tapping the melt off into a steel-casting crucible, leaving some of the melt in the vessel for a sump, f) vessel maintenance followed by charging with liquid raw iron over the residual sump and further processing of the starting metallurgicals as specified in the paragraphs a) through b) relating to vessel I.

The Bessemer decarbonization phase is now carried out in vessel II and the electric-arc furnace phase in vessel I

BRIEF DESCRIPTION OF THE DRAWINGS

One embodiment of the device in accordance with the present invention will now be specified with reference to the schematic drawing, wherein.

DESCRIPTION OF THE PREFERRED EMBODIMENTS

Figure 1:
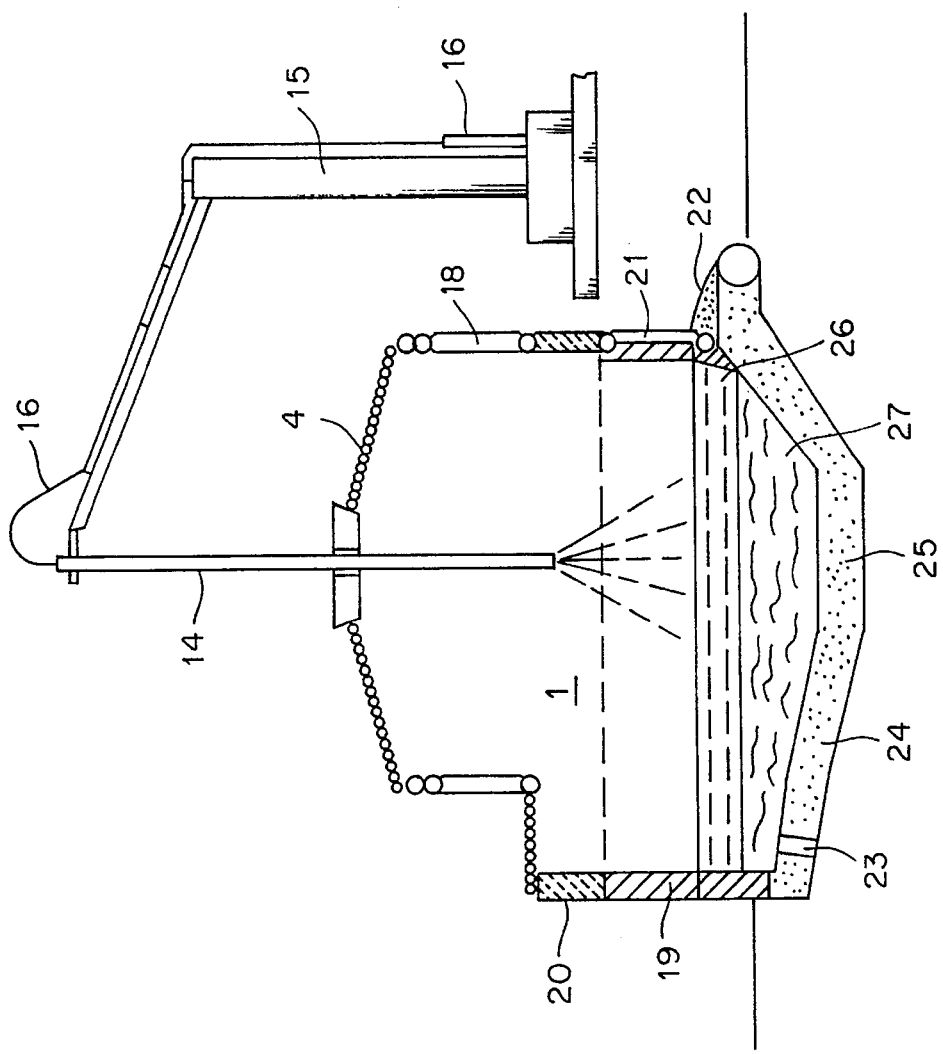
FIG. 1 is a side view of the vessel.

The arc furnace illustrated in FIG. 1 differs from a conventional furnace by a depression 25 in hearth 24 and by a higher wall 20 above the joint around vessel 1.

This measure expands the walled capacity of the furnace during the Bessemer decarbonization phase far enough to leave plenty of space for slag 26 and melt 27 while oxygen and lime are being injected through a lance 14 that can be raised and lowered by a series of mechanisms 15 and 16.

Vessel 1 is equipped in a known way with water-cooled wall sections 18 and a water-cooled lid 4 at the top. At the bottom of the vessel, at the level of a water-cooled slagging door 21 and of a preheater 22, the walls 19 and 20 of the vessel and tap 23, hearth 24, and depression 25 are lined with refractory material.

Lid 4 can be lifted and removed from the vicinity of the vessel 1 either by an unillustrated mechanism in the form of either a traveling or a pivoting crane.

Figure 2:
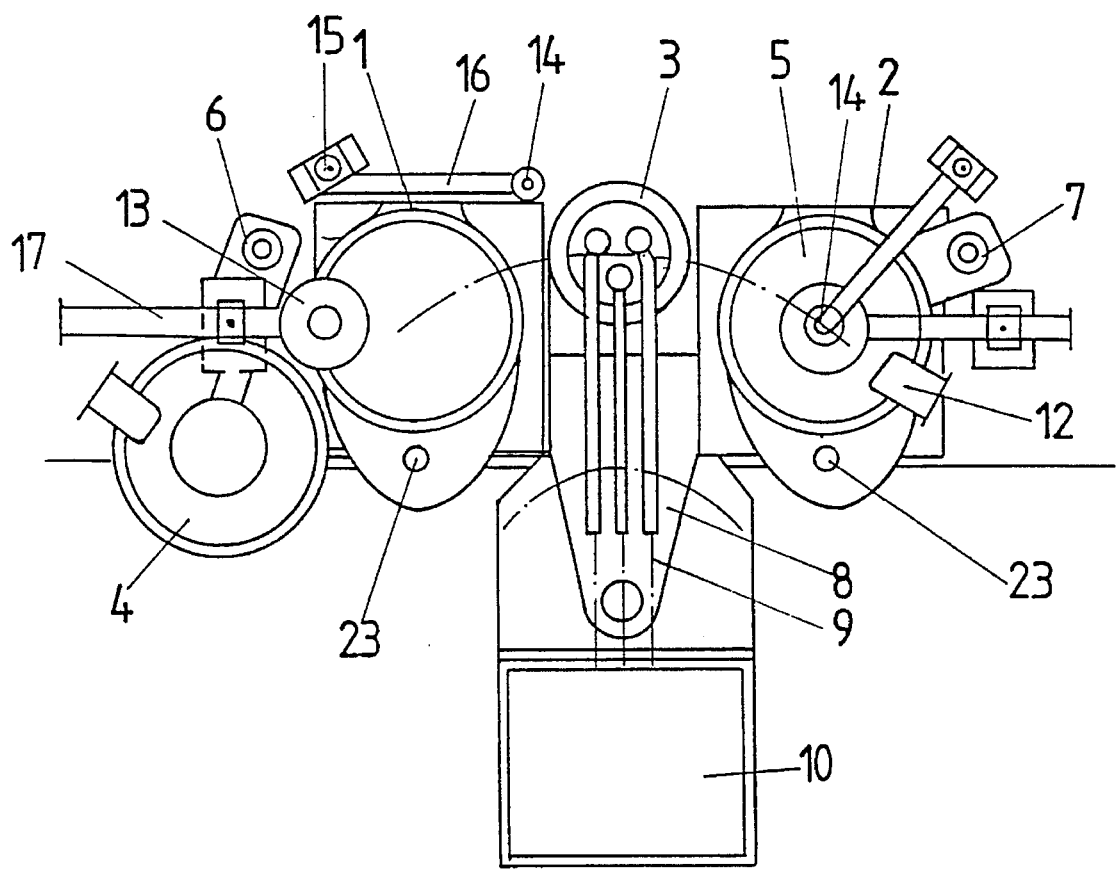
FIG. 2 is a top view of a two-vessel system.

FIG. 2 is a top view of a system with two vessels 1 and 2, electrodes 3 mounted on a pivoting mechanism 8 and 9, pivoting lids 4 & 6 and 5 & 7, a lance 14 and the mechanisms 15 and 16 that raise and lower it, and vents 11 and 12 that communicate with exhaust lines leading to a dust-removal point.

A hatch 13 mounted on the end of an arm 17 closes a hatchway in lid 4 or 5 while lance 14 is being employed and the electrodes 3 on pivoting mechanism 8 and 9 not.

Figure 3:
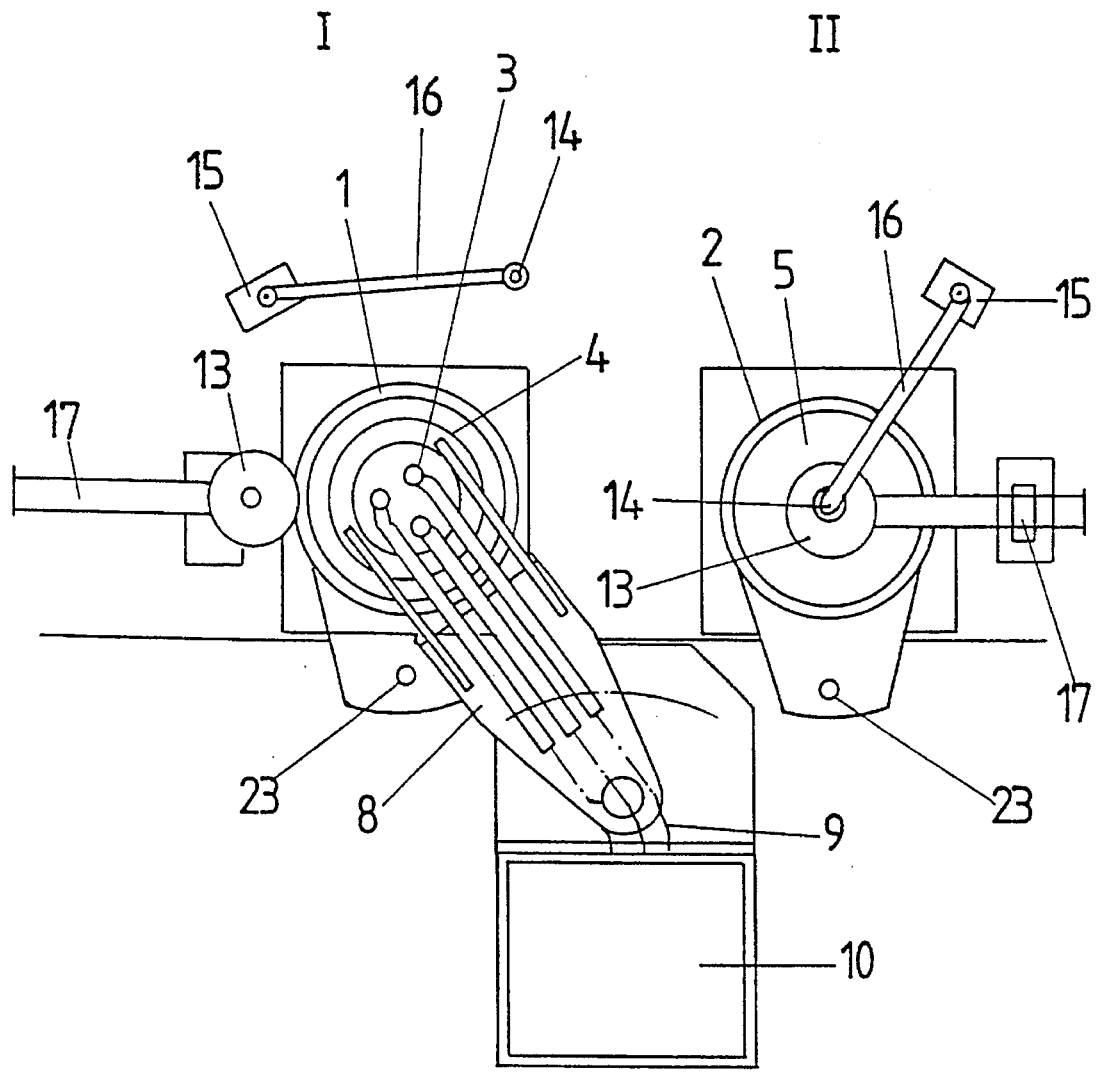
FIG. 3 is a top view of the same system in operation.

FIG. 3 is a top view of a two-vessel system in operation.

Vessel I 1 is in the electric-arc furnace phase. Electrodes 3 have been pivoted into position above lid 4 by pivoting mechanism 8 and 9. Vessel II 2 on the other hand is in the Bessemer decarbonization phase. It is covered by lid 5 and 6 and by hatch 13, with lance 14 extending through it.

The taps 23 in each vessel 1 and 2 are parallel and on the same side as the power supply lines 9 and transformer 10.

Figure 4:
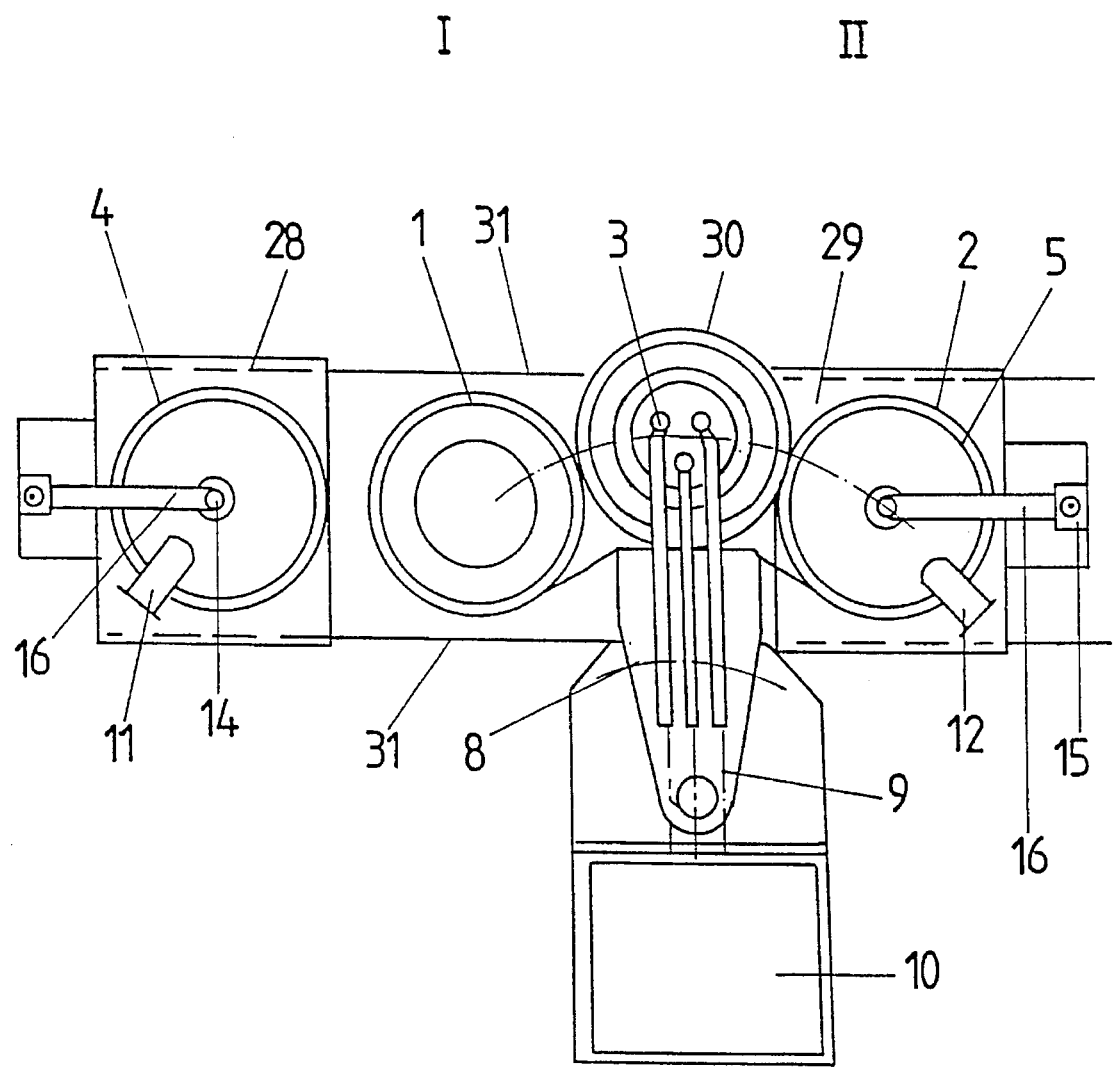
FIG. 4 is a top view of the system with a lid that travels back and forth on a carriage.

FIG. 4 is a top view of vessels 1 and 2. Lids 4 and 6 and lance 14 and the mechanisms 15 and 16 that raise and lower it ride back and forth on carriages 28 and 29 that travel on tracks 31.

The carriage 28 that the lid 4 on vessel 1 rides on has traveled aside, leaving the vessel uncovered. Mechanism 8 and 9 can pivot an electrode-equipped lid 30 over it.

Figure 5:
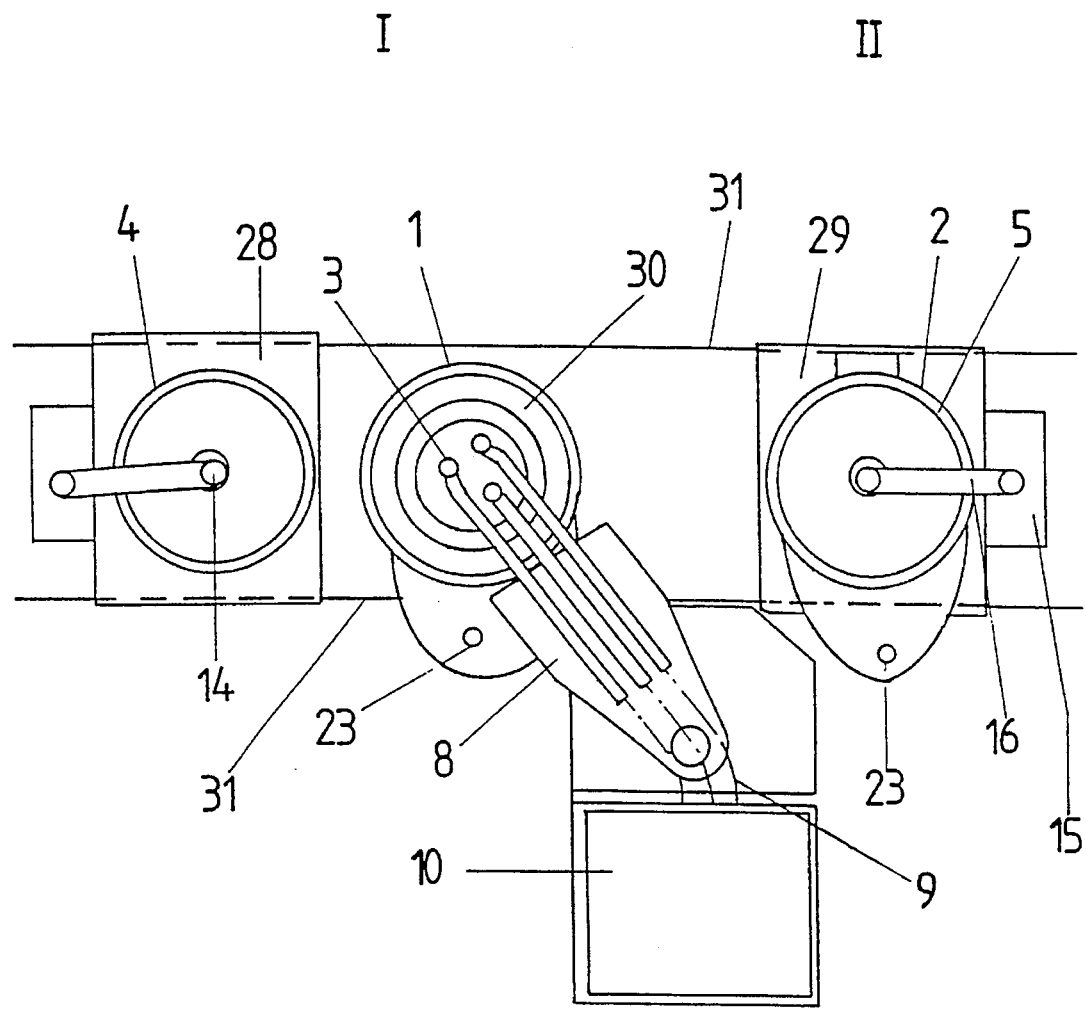
FIG. 5 is a top view of that system in operation.

FIG. 5 is a top view of vessels 1 and 2 with carriages 28 and 29 that travel back and forth on tracks 31 in operation.

Electrode-equipped lid 30 is resting on vessel 1. The carriage 28 with lance 14 has traveled aside. The vessel is in the arc-furnace Bessemer decarbonization phase [sic!].

Lid 5 is resting on vessel 2. Oxygen is being injected through lance 14, decarbonizing the raw iron. The vessel is in the Bessemer decarbonization phase.

We claim:

1. A method for operating a twin-shell arc furnace having a first furnace shell and a second furnace shell for making steel, comprising the steps of: arranging electrodes on a swing gantry; disconnecting completely one of said two furnace shells from a power supply and retaining the other furnace shell connected to the power supply; charging said one furnace shell with metallic charge materials and covered by a furnace roof; carrying out metallurgical processing in said other furnace shell until tapping of the melt; carrying out the following steps for said first furnace shell:

(a) charging liquid hot metal of an amount that is 70% of the total metallic charge of said first furnace shell;

(b) injecting by blowing oxygen through a blowing lance from above and through a furnace roof and adding simultaneously cooling agents selected from the group of ore, scrap, sponge iron and other metallic charge materials, as a function of a heat balance of said injecting step, and adding slag-forming agents as a function of an analysis of the metallic charge materials;

(c) removing continuously at least part of slag formed through a slag door and a preheater during said injecting step;

(d) retracting and swinging aside said blowing lance from said first furnace shell;

(e) swinging in said electrodes arranged on said swing gantry and connected to a power supply from a transformer to said first furnace shell;

(f) supplying said electrodes with electric current and adding simultaneously the remaining metallic charge until a tapping weight is attained, adding lime and additional injection through side-lances;

(g) removing continuously at least partially slag formed in said first furnace shell through said slag door and through said preheater during said step of supplying said electrodes with electric current and adding simultaneously the remaining metallic charge; and superheating the molten metal;

(h) tapping off the melt and into a steel casting crucible through a taphole and leaving a portion of said melt in said first furnace shell;

carrying out steps defined in preceding (e) to (h) in said second furnace shell while steps in preceding (a) to (d) are being carried out in said first furnace shell; and carrying out steps defined in preceding (a) to (d) in said second furnace shell while steps in preceding (e) to (h) are being carried out in said first furnace shell.

2. A twin-shell arc furnace having a first furnace shell and a second furnace shell for making steel, comprising: electrodes arranged on a single swing gantry; a power supply and means for disconnecting completely one of said two furnace shells from said power supply and retaining the other furnace shell connected to the power supply; means for charging said one furnace shell with metallic charge materials and a covering furnace roof; carrying out metallurgical processing in said other furnace shell until tapping of the melt; means in said first furnace shell and comprising:

(a) means for charging liquid hot metal of an amount that is 70% of the total metallic charge of said first furnace shell;

(b) means for injecting by blowing oxygen through a blowing lance from above and through a furnace roof and means for adding simultaneously cooling agents elected from the group of ore, scrap, sponge iron and other metallic charge materials, as a function of a heat balance of the injection, and means for adding slag-forming agents as a function of an analysis of the metallic charge materials;

(c) means for removing continuously at least part of slag formed through a slag door and a preheater during said injection;

(d) means for retracting and swinging aside said blowing lance from said first furnace shell;

(e) means for swinging in said electrodes, said electrodes being connected to said power supply from a transformer to said first furnace shell;

(f) said power supply supplying said electrodes with electric current, and means for adding simultaneously the remaining metallic charge until a tapping weight is attained; and side-lances for adding lime and additional injection;

(g) means for removing continuously at least partially slag formed in said first furnace shell through said slag door and through said preheater when said electrodes are supplied with electric current and the remaining metallic charge are added simultaneously; and means for superheating the molten metal;

(h) means for tapping off the melt and into a steel casting crucible through a taphole and leaving a portion of said melting in said first furnace shell;

preceding (e) to (h) being carried out in said second furnace shell while preceding (a) to (d) are being carried out in said first furnace shell, and preceding (a) to (d) being carried out in said second furnace shell while preceding (e) to (h) are carried out in said first furnace shell; said single swing gantry being operable with said first furnace shell and said second furnace shell; each said furnace shell having a sealing roof; means for raising and lowering said blowing lance; a hearth in each said furnace shell with a recess; each said furnace shell having refractory-lined walls and bricks arranged circumferentially around the top of the furnace shell.

3. A twin-shell arc furnace as defined in claim 2, including an additional cover attached to positionable supporting means for placing centrally on said furnace roof.

4. A twin-shell arc furnace as defined in claim 2, including roof traversing means for removing the furnace roof from each said furnace shell.

5. A twin-shell arc furnace as defined in claim 2, wherein said blowing lance is water cooled and comprises a multiple-hole lance.

6. A twin-shell arc furnace as defined in claim 2, wherein said furnace walls are cooled; and additional blowing lances extending through said cooled furnace walls.

7. A twin-shell arc furnace as defined in claim 2, including additional blowing lances extending through said furnace walls.

8. A twin-shell arc furnace as defined in claim 2, including additional blowing lances extending through said slag door.

9. A twin-shell arc furnace as defined in claim 2, wherein one of said electrodes is on said swing gantry and another electrode is in said hearth for generating a direct-current arc furnace.

10. A twin-vessel electric-arc furnace having a first furnace vessel and a second furnace vessel for making steel, comprising: a roof on each vessel; a swing gantry; electrodes mounted on said swing gantry; lances for injecting oxygen, fuel, lime and gas into each vessel; said electrodes being pivoted by said swing gantry; means for raising and lowering said lances; a hearth in each vessel with a recess; each vessel having a refractory-lined wall; and an additional wall extending around the top of said refractory-lined wall in each vessel.

* * * * *